United States Patent
Sun et al.

(10) Patent No.: US 11,695,301 B2
(45) Date of Patent: Jul. 4, 2023

(54) WIRELESS CHARGING METHOD AND DEVICE, FOLDABLE-SCREEN ELECTRONIC DEVICE AND STORAGE MEDIUM

(71) Applicant: BEIJING XIAOMI MOBILE SOFTWARE CO., LTD., Beijing (CN)

(72) Inventors: Changyu Sun, Beijing (CN); Wei Sun, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 213 days.

(21) Appl. No.: 16/903,612

(22) Filed: Jun. 17, 2020

(65) Prior Publication Data

US 2021/0210986 A1 Jul. 8, 2021

(30) Foreign Application Priority Data

Jan. 8, 2020 (CN) .......................... 202010017666.3

(51) Int. Cl.
*H02J 50/40* (2016.01)
*H02J 7/00* (2006.01)
(Continued)

(52) U.S. Cl.
CPC ............ *H02J 50/40* (2016.02); *H02J 7/0013* (2013.01); *H02J 7/00032* (2020.01); *H02J 7/02* (2013.01); *H02J 50/12* (2016.02); *H02J 50/80* (2016.02)

(58) Field of Classification Search
CPC ...... H02J 50/40; H02J 7/00032; H02J 7/0013; H02J 7/02; H02J 50/12; H02J 50/80;
(Continued)

(56) References Cited

U.S. PATENT DOCUMENTS 8,863,038 B2 * 10/2014 King ...................... G06F 1/1684
715/702
10,866,694 B2 * 12/2020 Kim ...................... G06F 1/1647
(Continued)

FOREIGN PATENT DOCUMENTS

CN 108923509 A * 11/2018 ............. H01F 38/14
CN 110119295 A 8/2019
(Continued)

OTHER PUBLICATIONS

Extended European Search Report in Application No. 20185411.4, dated Nov. 16, 2020.

*Primary Examiner* — Nghia M Doan
(74) *Attorney, Agent, or Firm* — Syncoda LLC; Feng Ma

(57) ABSTRACT

A wireless charging method includes: acquiring a charging type supported by a wireless charging device after handshake communication with the wireless charging device; and selecting a first receiving assembly and/or a second receiving assembly to charge batteries of a foldable-screen electronic device based on the charging type. By arranging the first receiving assembly and the second receiving assembly on the foldable-screen electronic device, at least one of the receiving assemblies can be selected for wireless charging the batteries of the electronic device when one side surface of the foldable-screen electronic device is proximal to the wireless charging device, thereby improving charging efficiency and shortening charging time. User experience can be improved as the users do not need to select a specified side surface for charging.

20 Claims, 11 Drawing Sheets

(51) Int. Cl.
*H02J 50/80* (2016.01)
*H02J 50/12* (2016.01)
*H02J 7/02* (2016.01)

(58) Field of Classification Search
CPC .... H02J 7/00034; H02J 7/0042; H02J 50/005;
H02J 50/402; H02J 50/90; H02J 50/10
See application file for complete search history.

(56) References Cited

U.S. PATENT DOCUMENTS

| | | | |
|---|---|---|---|
| 2016/0098064 A1* | 4/2016 | Becze | E05D 3/12 |
| | | | 361/679.3 |
| 2018/0198308 A1* | 7/2018 | Files | H04B 5/0037 |
| 2021/0064322 A1* | 3/2021 | Lim | G06F 1/1649 |

FOREIGN PATENT DOCUMENTS

| | | |
|---|---|---|
| EP | 2922176 A1 | 9/2015 |
| EP | 2993871 A1 | 3/2016 |
| EP | 3096437 A1 | 11/2016 |

* cited by examiner

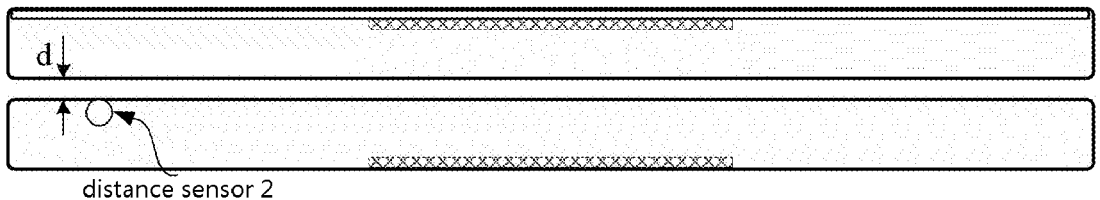

distance sensor 2

FIG. 6 acquiring gravity data among the spatial attitude data and a gravity component of the gravity data on Z axis perpendicular to the foldable-screen, a positive direction of the Z axis being oriented from the first side surface to the second side surface when the foldable-screen is folded — S71 determining that the first side surface of the foldable-screen electronic device is proximal to the wireless charging device when the gravity component is greater than the predetermined component threshold and points towards a negative direction of the Z axis; or determining that the second side surface of the foldable-screen electronic device is proximal to the wireless charging device when the gravity component is greater than the predetermined component threshold and points towards a positive direction of the Z axis — S72

FIG. 7

WIRELESS CHARGING METHOD AND DEVICE, FOLDABLE-SCREEN ELECTRONIC DEVICE AND STORAGE MEDIUM

CROSS-REFERENCE TO RELATED APPLICATION

This application claims priority to Chinese Patent Application No. 202010017666.3 filed on Jan. 8, 2020, the disclosure of which is hereby incorporated by reference in its entirety.

BACKGROUND

With consumers' ever-growing demands on display screen sizes, display screens particularly of mobile electronic devices are getting larger. Accordingly, power consumption of the foldable-screen electronic devices has increased.

SUMMARY

Various embodiments of the present disclosure provide a wireless charging method and device, a foldable-screen electronic device and a storage medium.

According to a first aspect of the embodiments of the present disclosure, there is provided a wireless charging method, applicable to a foldable-screen electronic device provided with a first receiving assembly and a second receiving assembly, including:

acquiring a charging type supported by a wireless charging device after handshake communication between the foldable-screen electronic device and the wireless charging device; and selecting the first receiving assembly and/or the second receiving assembly to charge batteries of the foldable-screen electronic device based on the charging type.

In some embodiments, the charging type includes resonant charging type; and the selecting the first receiving assembly and/or the second receiving assembly to charge the batteries of the foldable-screen electronic device based on the charging type includes:

selecting the first receiving assembly and the second receiving assembly to simultaneously charge the batteries.

In some embodiments, the charging type includes coupled charging type; and the selecting the first receiving assembly and/or the second receiving assembly to charge the batteries of the foldable-screen electronic device based on the charging type includes:

selecting the first receiving assembly or the second receiving assembly to independently charge the batteries.

In some embodiments, the selecting the first receiving assembly or the second receiving assembly to independently charge the batteries includes:

acquiring spatial attitude data acquired by a spatial attitude sensor in the foldable-screen electronic device;

acquiring the unfolded/folded state of the foldable-screen electronic device according to the spatial attitude data, the unfolded/folded state being that a foldable-screen of the foldable-screen electronic device is folded or the foldable-screen is unfolded;

acquiring a placed attitude of the foldable-screen electronic device when the unfolded/folded state is that the foldable-screen is folded, wherein the placed attitude is that a first side surface of the foldable-screen electronic device is proximal to the wireless charging device or that a second side surface of the foldable-screen electronic device is proximal to the wireless charging device;

selecting the first receiving assembly to charge the batteries when the placed attitude is that the first side surface of the foldable-screen electronic device is proximal to the wireless charging device; and selecting the second receiving assembly to charge the batteries when the placed attitude is that the second side surface of the foldable-screen electronic device is proximal to the wireless charging device.

In some embodiments, after the acquiring the unfolded/folded state of the foldable-screen electronic device according to the spatial attitude data, the method further includes:

switching on the first receiving assembly and the second receiving assembly when the unfolded/folded state is that the foldable-screen is unfolded;

acquiring the received power of the first receiving assembly and the second receiving assembly, respectively; and selecting the receiving assembly with large received power to charge the batteries, while switching off the receiving assembly with small received power, among the first and second receiving assemblies.

In some embodiments, the acquiring the unfolded/folded state of the foldable-screen electronic device according to the spatial attitude data includes:

acquiring distance data among the spatial attitude data; and determining that the unfolded/folded state is that the foldable-screen is folded when the distance data is less than a predetermined distance threshold; or determining that the unfolded/folded state is that the foldable-screen is unfolded when the distance data is greater than the predetermined distance threshold.

In some embodiments, the acquiring the placed attitude of the foldable-screen electronic device includes:

acquiring gravity data among the spatial attitude data and the gravity component of the gravity data on Z axis, the Z axis being perpendicular to the foldable-screen and oriented from the first side surface to the second side surface when the foldable-screen is folded; and determining that the placed attitude is that the first side surface of the foldable-screen electronic device is proximal to the wireless charging device when the gravity component is greater than a predetermined component threshold and points towards a negative direction of the Z axis; or determining that the placed attitude is that the second side surface of the foldable-screen electronic device is proximal to the wireless charging device when the gravity component is greater than the predetermined component threshold and points towards a positive direction of the Z axis.

In some embodiments, the acquiring the placed attitude of the foldable-screen electronic device includes:

acquiring distance data detected by a distance sensor in the foldable-screen electronic device; and determining that the placed attitude is that the second side surface of the foldable-screen electronic device is proximal to the wireless charging device when the distance data is less than a predetermined distance threshold; or determining that the placed attitude is that the first side surface of the foldable-screen electronic device is proximal to the wireless charging device when the distance data is greater than the predetermined distance threshold.

In some embodiments, after the acquiring the placed attitude of the foldable-screen electronic device, the method further includes:

switching off the first receiving assembly and the second receiving assembly to stop charging the batteries when the placed attitude is an attitude except that the first side surface of the foldable-screen electronic device is proximal to the wireless charging device and the second side surface of the foldable-screen electronic device is proximal to the wireless charging device.

According to a second aspect of the embodiments of the present disclosure, there is provided a wireless charging device, applicable to a foldable-screen electronic device provided with a first receiving assembly and a second receiving assembly, including:

a charging type acquisition portion configured to acquire the charging type supported by the wireless charging device after handshake communication between the foldable-screen electronic device and the wireless charging device; and a receiving assembly selection portion configured to select the first receiving assembly and/or the second receiving assembly to charge batteries of the foldable-screen electronic device based on the charging type.

In some embodiments, the charging type includes resonant charging type; and the receiving assembly selection portion includes:

a simultaneous selection sub-portion configured to select the first receiving assembly and the second receiving assembly to simultaneously charge the batteries.

In some embodiments, the charging type includes coupled charging type; and the receiving assembly selection portion includes:

an independent selection sub-portion configured to select the first receiving assembly or the second receiving assembly to independently charge the batteries.

In some embodiments, the independent selection sub-portion includes:

an attitude data acquisition section configured to acquire spatial attitude data collected by a spatial attitude sensor in the foldable-screen electronic device;

an unfolded/folded state acquisition section configured to acquire the unfolded/folded state of the foldable-screen electronic device according to the spatial attitude data, the unfolded/folded state comprising that the foldable-screen is folded or the foldable-screen is unfolded;

a placed attitude acquisition section configured to acquire the placed attitude of the foldable-screen electronic device when the unfolded/folded state is that the foldable-screen is folded, the placed attitude being that a first side surface of the foldable-screen electronic device is proximal to the wireless charging device, or that a second side surface of the foldable-screen electronic device is proximal to the wireless charging device; and a receiving assembly selection section configured to select the first receiving assembly to charge the batteries when the placed attitude is that the first side surface of the foldable-screen electronic device is proximal to the wireless charging device, or select the second receiving assembly to charge the batteries when the placed attitude is that the second side surface of the foldable-screen electronic device is proximal to the wireless charging device.

In some embodiments, the independent selection sub-portion further includes:

a receiving assembly switching-on section configured to switch on the first receiving assembly and the second receiving assembly when the unfolded/folded state is that the foldable-screen is unfolded; and a received power acquisition section configured to acquire the received power of the first receiving assembly and the second receiving assembly, respectively; and the receiving assembly selection section is further configured to select the receiving assembly with large received power to charge the batteries and simultaneously switch off the receiving assembly with small received power, among the first and second receiving assemblies.

In some embodiments, the unfolded/folded state acquisition section includes:

a distance data acquisition sub-section configured to acquire distance data among the spatial attitude data; and an unfolded/folded state determination sub-section configured to determine that the unfolded/folded state is that the foldable-screen is folded when the distance data is less than a predetermined distance threshold, or determine that the unfolded/folded state is that the foldable-screen is unfolded when the distance data is greater than the predetermined distance threshold.

In some embodiments, the placed attitude acquisition section includes:

a gravity component acquisition sub-section configured to acquire gravity data among the spatial attitude data and the gravity component of the gravity data on Z axis, the Z axis being perpendicular to the foldable-screen and oriented from the first side surface to the second side surface when the foldable-screen is folded; and a placed attitude determination sub-section configured to determine that the placed attitude is that the first side surface of the foldable-screen electronic device is proximal to the wireless charging device when the gravity component is greater than a predetermined component threshold and points towards a negative direction of the Z axis, or determine that the placed attitude is that the second side surface of the foldable-screen electronic device is proximal to the wireless charging device when the gravity component is greater than the predetermined component threshold and points towards a positive direction of the Z axis.

In some embodiments, the placed attitude acquisition section includes:

a distance data acquisition sub-section configured to acquire distance data detected by a distance sensor in the foldable-screen electronic device; and a placed attitude determination sub-section configured to determine that the placed attitude is that the second side surface of the foldable-screen electronic device is proximal to the wireless charging device when the distance data is less than a predetermined distance threshold, or determine that the placed attitude is that the first side surface of the foldable-screen electronic device is proximal to the wireless charging device when the distance data is greater than the predetermined distance threshold.

In some embodiments, the receiving assembly selection section is further configured to switch off the first receiving assembly and the second receiving assembly to stop charging the batteries, when the placed attitude is an attitude except that the first side surface of the foldable-screen electronic device is proximal to the wireless charging device and the second side surface of the foldable-screen electronic device is proximal to the wireless charging device.

According to a third aspect of the embodiments of the present disclosure, there is provided a foldable-screen electronic device, including:

a foldable-screen;

a first receiving assembly;

a second receiving assembly;

a processor connected with the first receiving assembly and the second receiving assembly, respectively;

memory storing instructions for execution by the processor; and batteries connected with the first receiving assembly and the second receiving assembly, respectively;

wherein the processor is configured to execute executable instructions in the memory to implement any method described above.

In some embodiments, a receiving coil in the first receiving assembly is arranged on a first side surface of the foldable-screen electronic device; a receiving coil in the second receiving assembly is arranged on a second side surface of the foldable-screen electronic device; the first side surface is a side surface opposite to an external display screen when the foldable-screen is folded, and the second side surface is a side surface provided with the external display screen when the foldable-screen is folded; or the first side surface is a side surface provided with an auxiliary display screen when the foldable-screen is folded, and the second side surface is a side surface provided with a main display screen when the foldable-screen is folded.

In some embodiments, an offset distance between a center position of the receiving coil in the first receiving assembly and a center position of the receiving coil in the second receiving assembly is less than a predetermined distance threshold.

In some embodiments, the foldable-screen electronic device further includes a spatial attitude sensor configured to sense attitude data of the foldable-screen electronic device.

In some embodiments, the foldable-screen electronic device further includes a distance sensor configured to sense distance data between the foldable-screen electronic device and the wireless charging device.

According to a fourth aspect of the embodiments of the present disclosure, there is provided a non-transitory computer-readable storage medium, having stored thereon instructions for execution by a processor to implement the method described above.

It should be understood that the above general description and the following detailed description are exemplary and explanatory, and are not intended to limit the present disclosure.

BRIEF DESCRIPTION OF THE DRAWINGS

The accompanying drawings, which are incorporated in and constitute a part of this disclosure, illustrate embodiments consistent with the disclosure and, together with the disclosure, serve to explain the principles of the disclosure.

FIG. 6 is a diagram illustrating an effect when the foldable-screen electronic device is folded.

FIG. 7 is a flowchart illustrating the process of determining the placed attitude by utilization of gravity data in accordance with some embodiments.

DETAILED DESCRIPTION

Figure 1A:
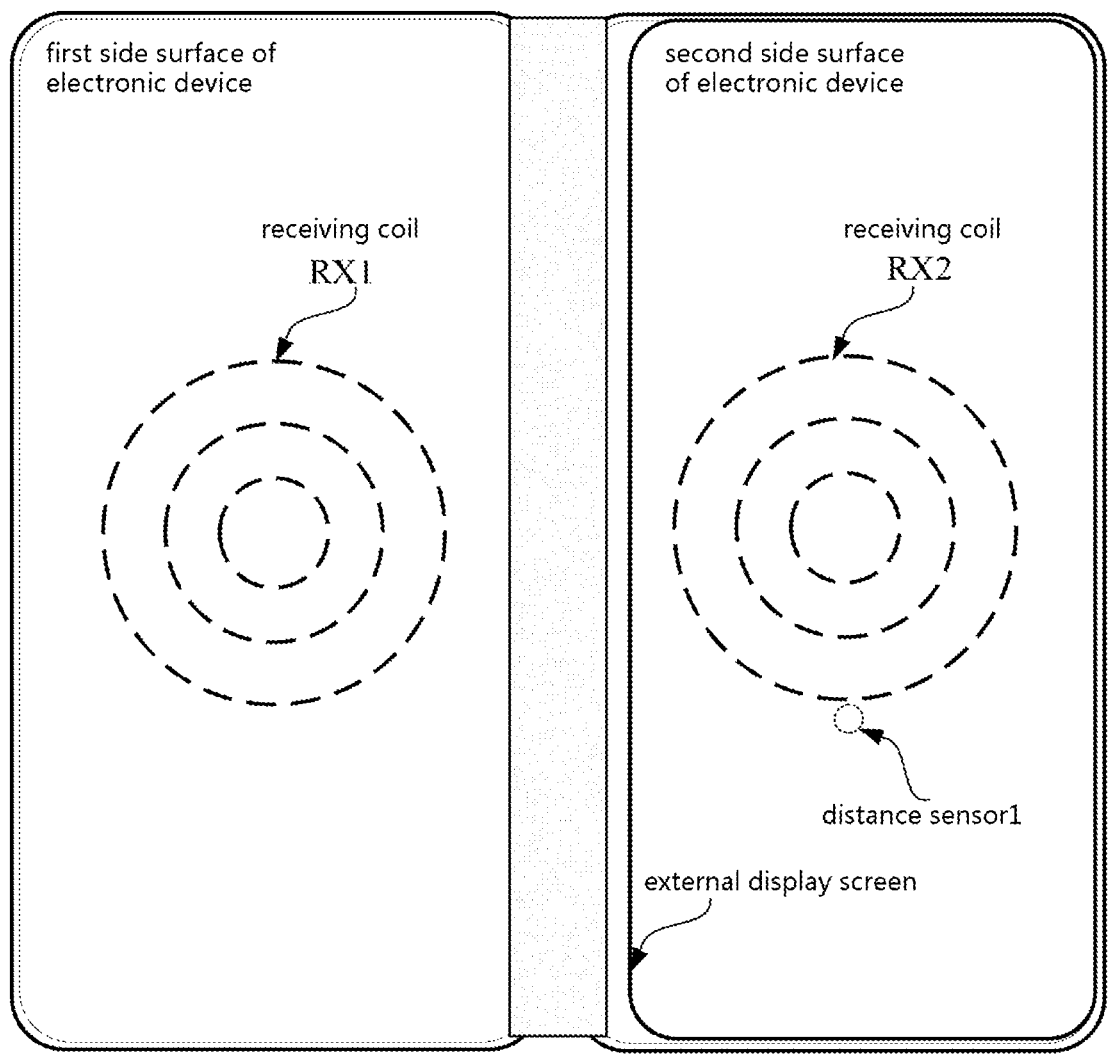
FIG. 1A illustrates a back view of a foldable-screen electronic device when a foldable-screen is unfolded in accordance with some embodiments.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

Foldable-screen electronic devices can be convenient to users. Various embodiments of the present disclosure can apply wireless charging technologies to foldable-screen electronic devices, further improving user experience, particularly for larger-foldable-screen devices.

A foldable-screen electronic device typically can use a single receiving coil, for example, arranged in a back casing of the foldable-screen electronic device. As such, the user can attach a back casing to the wireless charging device, for wirelessly charging the foldable-screen electronic device. When the user attaches an external display screen to the wireless charging device or the foldable-screen is unfolded without a receiving assembly in an attaching area, the distance between the receiving coil and a transmitting coil becomes larger, causing low receiving efficiency of the receiving coil, prolonging the charging time or even charging failure, thereby deteriorating the user experience.

Various embodiments of the present disclosure provide a foldable-screen electronic device provided with two receiving assemblies, respectively referred to as a first receiving assembly and a second receiving assembly for distinguishing each other. In the embodiment, the foldable-screen electronic device includes a foldable-screen having two display screens foldable relative to each other. After the foldable-screen is folded, among two display screens, the display screen that can be used is referred to as an external display screen, and the hidden display screen is referred to as a built-in display screen. In other words, when the foldable-screen is unfolded, a display screen with large area is the built-in display screen and a display screen with small area is the external display screen. It should be noted that unfolding (opening) of the foldable-screen can include full unfolding and partial unfolding, where full unfolding means that two portions (or a plurality of portions) of the foldable-screen form a flat plane, and partial unfolding means that a certain included angle greater than 90 degrees is formed between the two portions of the foldable-screen. It should be noted that folding (closing) of the foldable-screen can include full folding and partial folding, where full folding means that the two portions of the foldable-screen are close/proximal (or parallel), and partial folding means that a certain included angle less than 90 degrees is formed between the two portions of the foldable-screen. For the convenience of description, the subsequent embodiments are described with full unfolding as an example of foldable-screen unfolding and full folding as an example of foldable-screen folding.

Herein, it should be noted that "close/proximal" means that the distance between the electronic device and the wireless charging device is less than or equal to a predetermined distance threshold (such as 2 cm, which is adjustable). In one example, when the distance between the electronic device and the wireless charging device is zero, the electronic device is attached to the wireless charging device with a greatest charging efficiency.

For easy description, when the foldable-screen is folded with the two portions of the foldable-screen close/proximal to each other as an example, one side surface away from the external display screen is referred to as a first side surface, and one side surface at which the external display screen is provided is referred to as a second side surface. When the foldable-screen is folded with the two portions of the foldable-screen arranged external (that is, parallel) as an example, one side surface at which an auxiliary display screen is placed is referred to as the first side surface, and one side surface at which a main display screen is provided is referred to as the second side surface.

In the embodiment, a receiving coil (RX1) in the first receiving assembly may be disposed on the first side surface, and a receiving coil (RX2) in the second receiving assembly may be disposed on the second side surface.

Figure 1B:
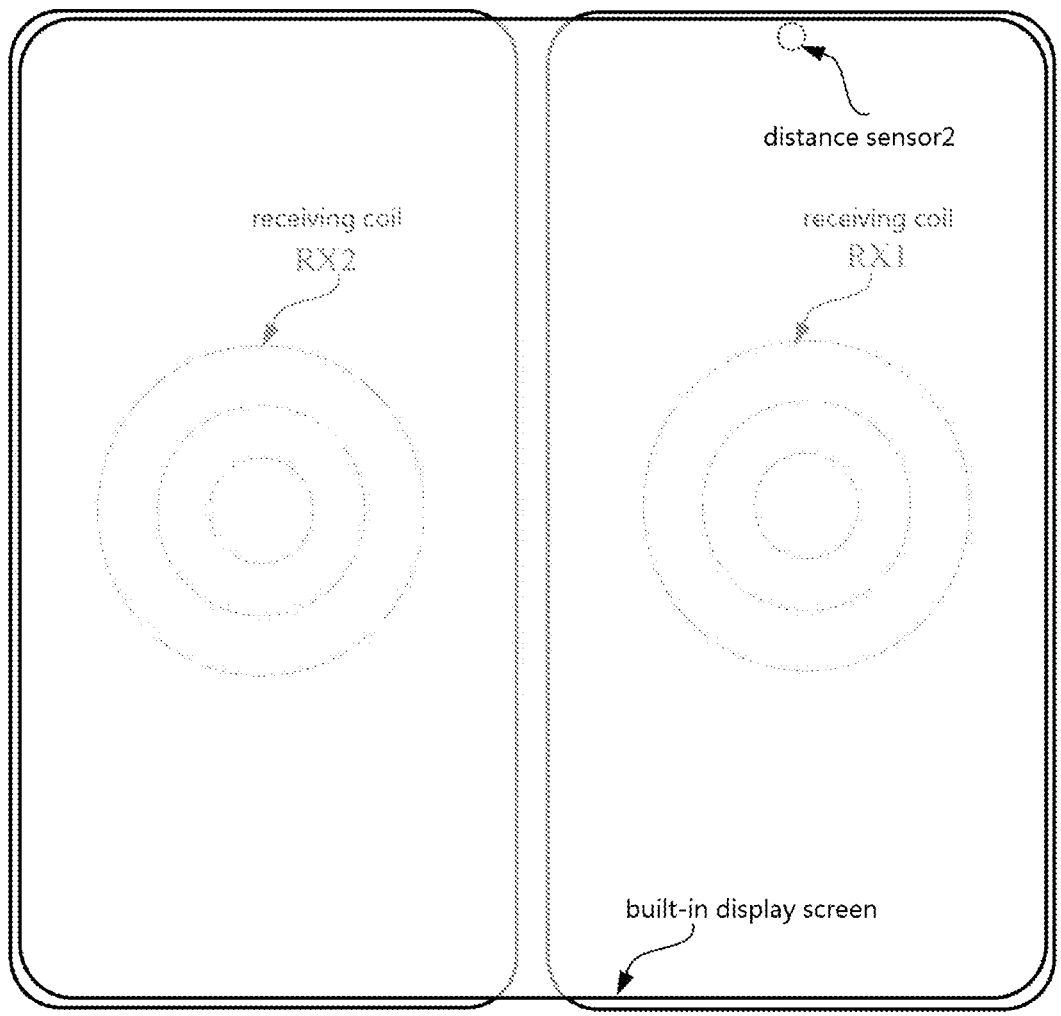
FIG. 1B illustrates a front view of a foldable-screen electronic device when the foldable-screen is unfolded in accordance with some embodiments.
Figure 1C:
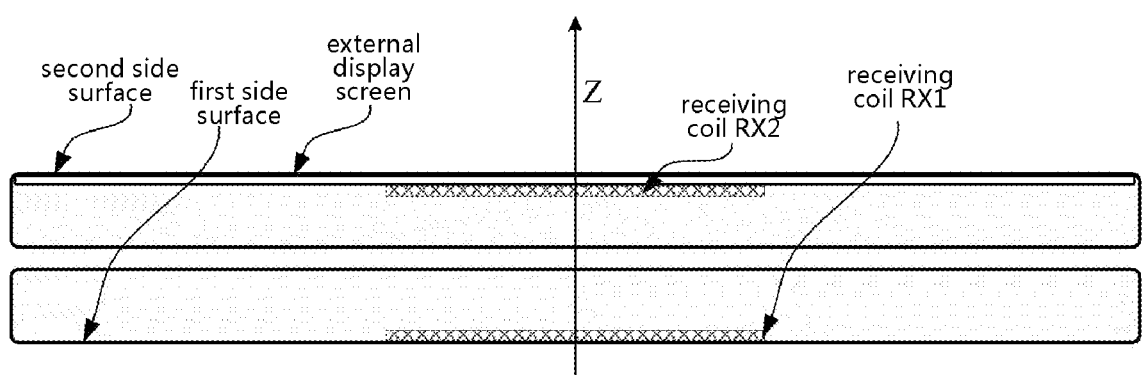
FIG. 1C illustrates a state when the foldable-screen in the foldable-screen electronic device is folded in accordance with some embodiments.

FIGS. 1A, FIG. 1B, and FIG. 1C are schematic diagrams illustrating a foldable-screen electronic device in accordance with some embodiments.

FIG. 1A shows a back view of a foldable-screen electronic device with an unfolded foldable-screen, wherein the receiving coil RX1 disposed on the first side surface of the electronic device and the receiving coil RX2 disposed on the second side surface of the electronic device are shown as thick dotted lines to indicate that they are disposed on corresponding side surfaces. In addition, the external display screen is disposed on the second side surface.

FIG. 1B shows a front view of the foldable-screen electronic device with an unfolded foldable-screen, wherein a built-in display screen is shown in the front view. The receiving coil RX1 and the receiving coil RX2 are shown as thin dotted lines to indicate that they are disposed on corresponding folded sections on one side surface away from the built-in display screen.

FIG. 1C shows the folded state of the foldable-screen in the foldable-screen electronic device, wherein the external display screen is disposed on the second side surface of the electronic device; the receiving coil RX2 is disposed on the second side surface; and the receiving coil RX1 is disposed on the first side surface of the electronic device. That is, FIG. 1C shows the effect when the receiving coil RX2 is disposed on the second side surface of the foldable-screen electronic device. In actual application, the setting position that the receiving coil RX1 and the receiving coil RX2 are respectively disposed on the first side surface and the second side surface is not specifically limited. Taking into account user habits and charging efficiency, in one example, centers of the receiving coil RX1 and the receiving coil RX2 are aligned, that is, a center projection of the receiving coil RX1 and a center projection of the receiving coil RX2 coincide when the external display screen (Z-axis direction) is viewed from the back casing of the foldable-screen electronic device as the foldable-screen is folded.

Figure 2:
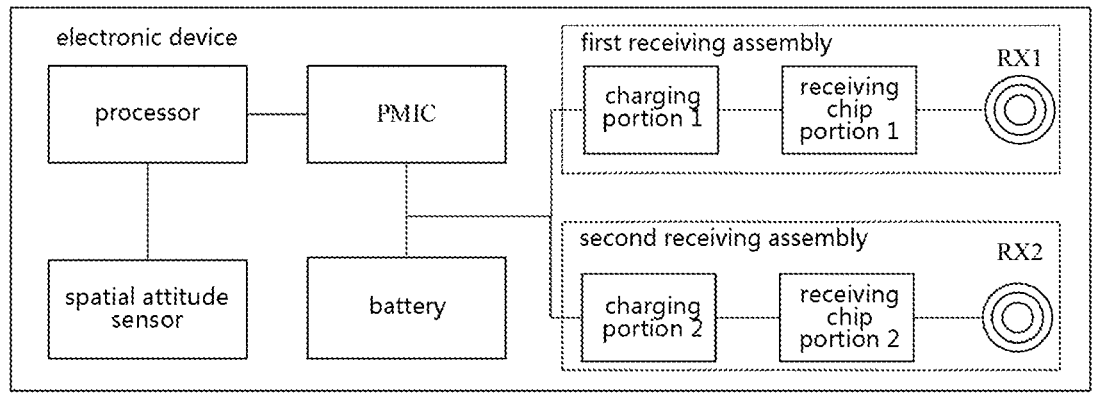
FIG. 2 is a circuit diagram illustrating a foldable-screen electronic device in accordance with some embodiments.

FIG. 2 illustrates a circuit diagram of a foldable-screen electronic device in accordance with some embodiments. Referring to FIG. 2, the foldable-screen electronic device includes a processor, a first receiving assembly and a second receiving assembly. The processor is connected with the first receiving assembly and the second receiving assembly respectively, and may control the switching of the first receiving assembly and the second receiving assembly respectively, so as to select the first receiving assembly to charge batteries, select the second receiving assembly to charge the batteries, or select the two receiving assemblies to simultaneously charge the batteries. As such, in the embodiment, the first receiving assembly and the second receiving assembly are arranged in the foldable-screen electronic device, such that at least one of the two receiving assemblies can be selected to operate wireless charging of the batteries of the electronic device when one side surface of the foldable-screen electronic device is proximal to the wireless charging device, improving the charging efficiency and shortening the charging time. Moreover, the use experience can be improved as the users do not need to select a specified side surface for charging.

Continuously referring to FIG. 2, in the embodiment, the foldable-screen electronic device further includes a spatial attitude sensor.

In one example, the spatial attitude sensor may be one or more of a gravity sensor, an acceleration sensor or a gyroscope and may be selected according to specific circumstances. The spatial attitude sensor acquires spatial attitude data of the foldable-screen electronic device and sends the spatial attitude data to a processor. The processor may acquire the unfolded/folded state and/or the placed attitude of the foldable-screen electronic device according to the spatial attitude data. As such, the processor may adopt at least one of the first receiving assembly and the second receiving assembly to charge the batteries of the foldable-screen electronic device according to the unfolded/folded state and/or the placed attitude of the foldable-screen electronic device, realizing high-efficiency charging and shortening the charging time as much as possible.

In another example, the spatial attitude sensor may be a distance sensor. When the volume of the wireless charging device is large, the distance sensor may be disposed on the top of the foldable-screen electronic device. When the volume of the wireless charging device is small, the distance sensor may be disposed near one of receiving coils RX1 and RX2.

As an example, the distance sensor 1 is disposed on one side surface at which the external display screen is provided (i.e., the second side surface of the foldable-screen electronic device), as shown in FIG. 1A. When the first side surface of the foldable-screen electronic device is proximal to the wireless charging device, the distance sensor cannot detect the distance value (may be represented by an invalid identifier) or the detected distance value is infinite (a value exceeding the detection range is considered as infinite by default), and the processor can determine that the distance sensor is away from the wireless charging device according to the fact that the distance value is greater than the distance threshold, and then may determine that a placed attitude of the foldable-screen electronic device is that the first side surface of the foldable-screen electronic device is proximal to the wireless charging device. When the second side surface of the foldable-screen electronic device is proximal to the wireless charging device, the distance sensor can detect that the distance value is less than the distance threshold, and the processor can determine that the distance sensor is proximal to the wireless charging device according to the fact that the distance value is less than the distance threshold, and then may determine that the placed attitude of the foldable-screen electronic device is that the second side surface of the foldable-screen electronic device is proximal to the wireless charging device.

Meanwhile, the distance sensor 2 may be disposed on one side surface at which the built-in display screen is provided as shown in FIG. 1B. When the foldable-screen is folded, the distance value detected by the distance sensor is less than the distance threshold; and when the foldable-screen is unfolded, the distance value detected by the distance sensor is greater than the distance threshold, and then the unfolded/folded state of the foldable-screen can be determined according to distance data.

Figure 3:
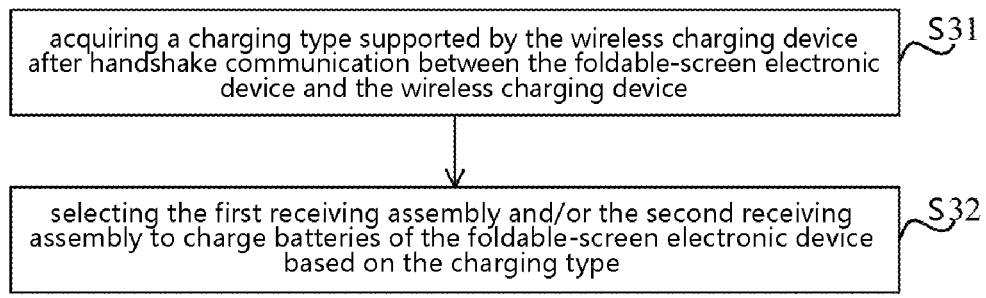
FIG. 3 is a flowchart illustrating a wireless charging method in accordance with some embodiments.

Based on the above foldable-screen electronic device, the embodiment of the present disclosure provides a wireless charging method. FIG. 3 is a flowchart illustrating a wireless charging method in accordance with some embodiments. Referring to FIG. 3, the wireless charging method includes S31 and S32, wherein:

In S31: acquiring the charging type supported by the wireless charging device after handshake communication between the foldable-screen electronic device and the wireless charging device.

In the embodiments, the wireless charging device may send a pulse detection signal with a predetermined period (in broadcast mode) in accordance with the internally set wireless charging protocol, such as Qi protocol or A4WP protocol, in order to detect whether the foldable-screen electronic device to be charged is placed on the wireless charging device. If the wireless charging protocol is Qi protocol as an example, the pulse detection signal may be a power signal of a ping phase.

In the embodiments, after the foldable-screen electronic device is placed on the wireless charging device, the first receiving assembly and/or the second receiving assembly in the foldable-screen electronic device may receive the above pulse detection signal. In response to the above pulse detection signal, the first receiving assembly and/or the second receiving assembly may send a pulse response signal to the wireless charging device. After receiving the above pulse response signal, the wireless charging device can determine that the foldable-screen electronic device is placed thereon, thereby finishing the handshake communication process.

After handshake communication, the foldable-screen electronic device can determine the charging type supported by the wireless charging device according to the used wireless charging protocol or communication data during the handshake process, wherein the charging type may include at least one of resonant charging type and coupled charging type. Further, the resonant charging type refers to that the wireless charging device can radiate energy by emitting electromagnetic waves with a predetermined resonance frequency, and as such, the resonant frequency of the first receiving assembly and the second receiving assembly matches with the predetermined resonance frequency; and the coupled charging type indicates that the wireless charging device can radiate energy by emitting electromagnetic waves with different frequencies, and as such, the receiving coil is located within the radiation range.

As for the wireless charging device, after the handshake process is finished, the wireless charging device can control the radiation energy of a transmitting coil, so as to perform subsequent wireless charging process. The specific content may refer to relevant wireless charging protocol, and no further description will be given herein.

In S32: selecting the first receiving assembly and/or the second receiving assembly to charge batteries of the foldable-screen electronic device based on the charging type.

In the embodiments, after acquiring the charging type supported by the wireless charging device, in which the charging type includes at least one of resonant charging type and coupled charging type, the processor may select at least one of the first receiving assembly or the second receiving assembly to charge the batteries:

In an example, when the charging type is the resonant charging type, as the distance requirement of the resonant charging type is less stricter than the distance and shielding requirement of the coupled charging type, the processor may select both the first receiving assembly and the second receiving assembly to simultaneously charge the batteries of the foldable-screen electronic device. About the working principle of resonant type wireless charging, please refer to relevant techniques, and no further description will be given herein.

In another example, when the charging type is the coupled charging type, the processor may select the first receiving assembly or the second receiving assembly to independently charge the batteries of the foldable-screen electronic device, according to the selection principle of selecting a charging portion proximal to the wireless charging device to charge the batteries of the foldable-screen electronic device.

Figure 4:
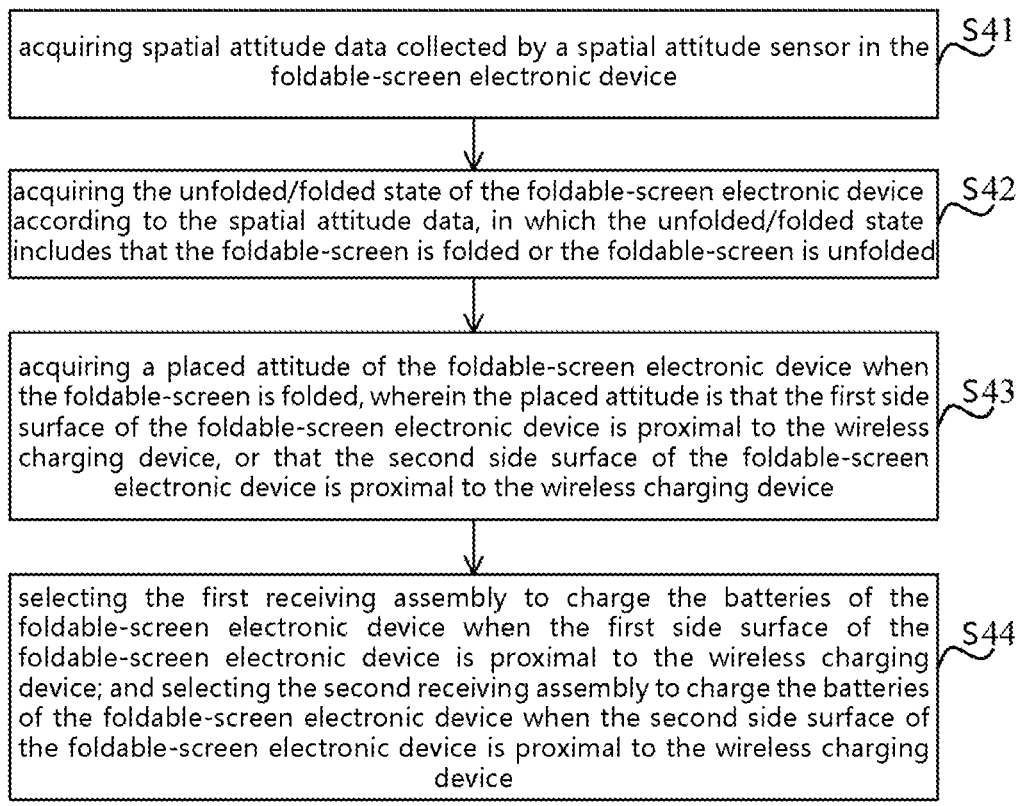
FIG. 4 is a flowchart illustrating the process of selecting a receiving assembly in accordance with some embodiments.

In the example, the processor selects the receiving assemblies according to the unfolded/folded state of the foldable-screen electronic device. Referring to FIG. 4:

In S41, the processor may acquire spatial attitude data collected by a spatial attitude sensor in the foldable-screen electronic device.

Figure 5:
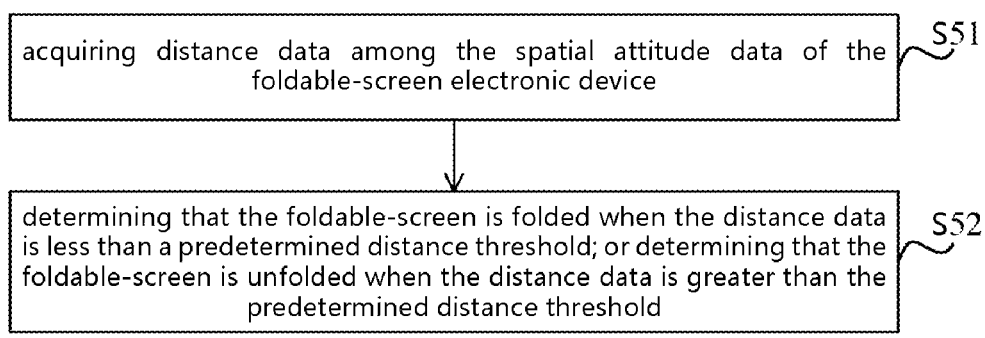
FIG. 5 is a flowchart illustrating the process of acquiring the unfolded/folded state of the foldable-screen electronic device in accordance with some embodiments.

In S42, the processor may acquire the unfolded/folded state of the foldable-screen electronic device according to the spatial attitude data, wherein the unfolded/folded state includes that the foldable-screen is folded and the foldable-screen is unfolded. For example, the spatial attitude data include distance data (e.g., a distance value collected by a distance sensor 2 in FIG. 1B) as an example, the distance data referring to a distance value between two folded portions in the electronic device. Referring to FIG. 5, in S51, the processor can acquire the distance data among the spatial attitude data of the foldable-screen electronic device. In S52, when the distance data is less than a predetermined distance threshold, the processor can determine that the foldable-screen is in a folded state, as shown in FIG. 6; or when the distance data is greater than the predetermined distance threshold, the processor can determine that the foldable-screen is in an unfolded state, as shown in FIG. 1B.

In S43, when the unfolded/folded state is that the foldable-screen is folded, the placed attitude of the foldable-screen electronic device is acquired, wherein the placed attitude is that the first side surface of the foldable-screen electronic device is proximal to the wireless charging device, or that the second side surface of the foldable-screen electronic device is proximal to the wireless charging device.

As an example, the spatial attitude data include gravity data, the processor may acquire the placed attitude of the foldable-screen electronic device. Referring to FIG. 7, in S71, the processor may acquire the gravity data among the spatial attitude data and the gravity component of the gravity data on Z axis. Herein, the Z axis is perpendicular to the foldable-screen and oriented from the first side surface to the second side surface when the foldable-screen is folded, as shown in FIG. 1C. In S72, when the gravity component is greater than the predetermined component threshold towards a negative direction of the Z axis, the placed attitude is determined that the first side surface of the foldable-screen electronic device is proximal to the wireless charging device; or when the gravity component is greater than the predetermined component threshold towards a positive direction of the Z axis, the placed attitude is determined that the second side surface of the foldable-screen electronic device is proximal to the wireless charging device.

Figure 8:
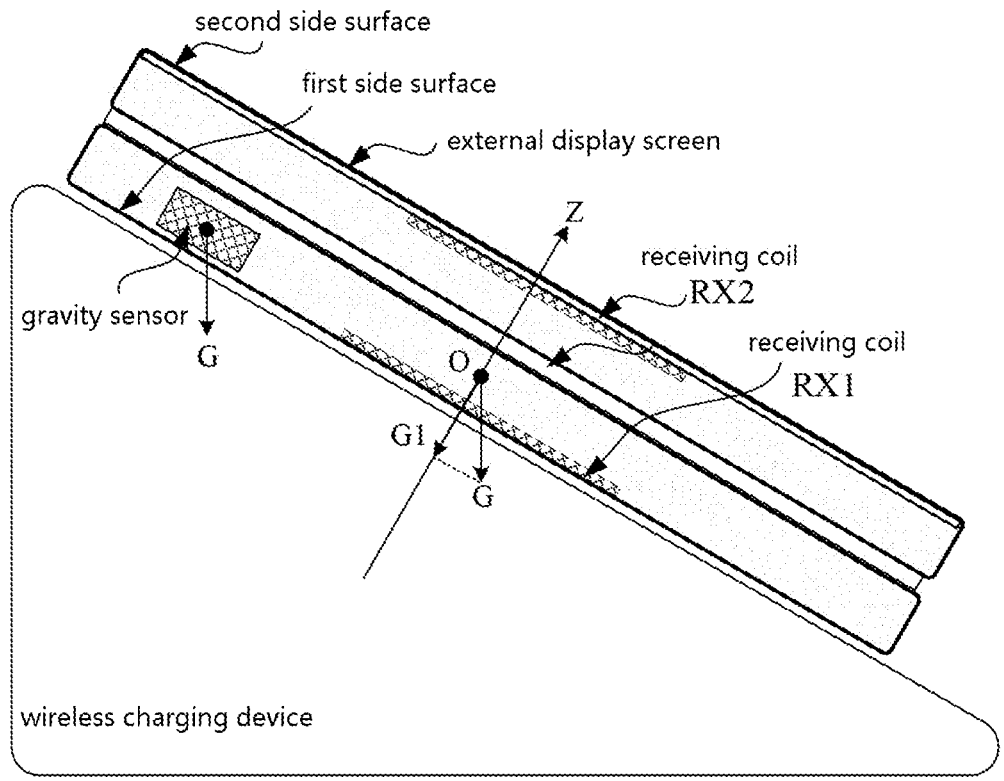
FIG. 8 is a diagram illustrating the process of acquiring the gravity component.

Referring to FIG. 8, the spatial attitude sensor can acquire the gravity G and an inclination angle of the foldable-screen electronic device, and at the same time, can acquire the gravity component G1 of the gravity G on the Z axis. As to the approach of calculating gravity component G1, please refer to relevant arts and no limitation will be given herein. Subsequently, the processor can compare the gravity component G1 with the gravity threshold Gn. When the gravity component G1 is greater than the gravity threshold Gn towards the negative direction of the Z axis, the processor can determine that the placed attitude is that the first side surface is proximal to the wireless charging device, as shown in FIG. 8; when the gravity component G1 is greater than the gravity threshold Gn towards the positive direction of the Z axis, the processor can determine that the placed attitude is that the second side surface is proximal to the wireless charging device (not shown); and when the gravity component G1 is less than the gravity threshold Gn, the processor may determine the foldable-screen electronic device with other placed attitudes.

Figure 9:
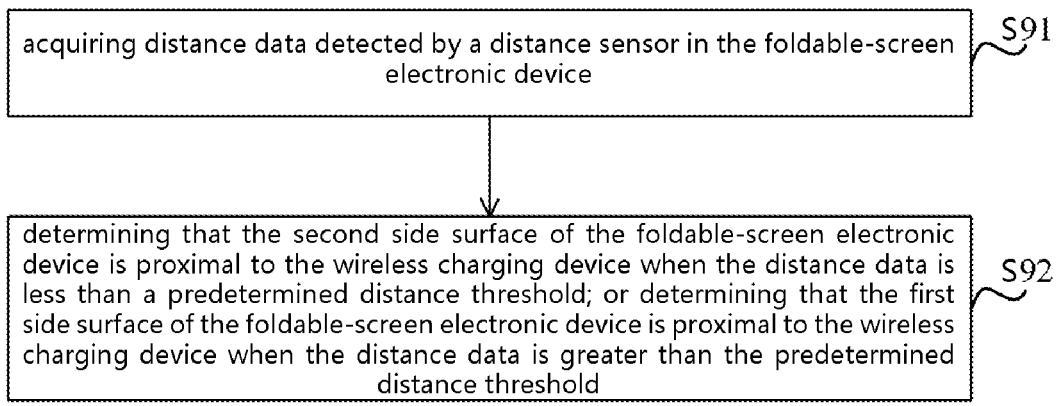
FIG. 9 is a flowchart illustrating the process of determining the placed attitude by utilization of distance data in accordance with some embodiments.
Figure 10A:
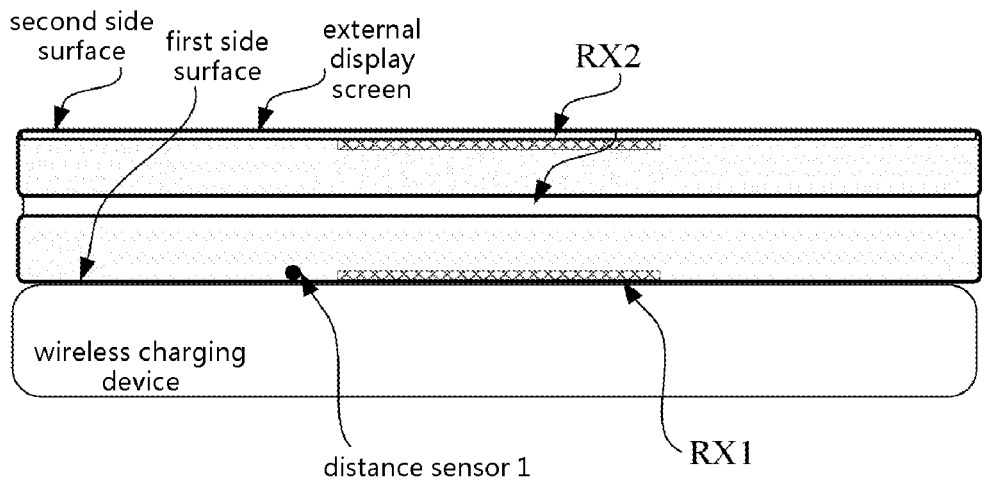
FIG. 10A is a schematic diagram illustrating a placed attitude determined according to the distance data, wherein a second side surface (i.e., a side surface provided with an external display screen) in the foldable-screen electronic device is proximal to the wireless charging device.
Figure 10B:
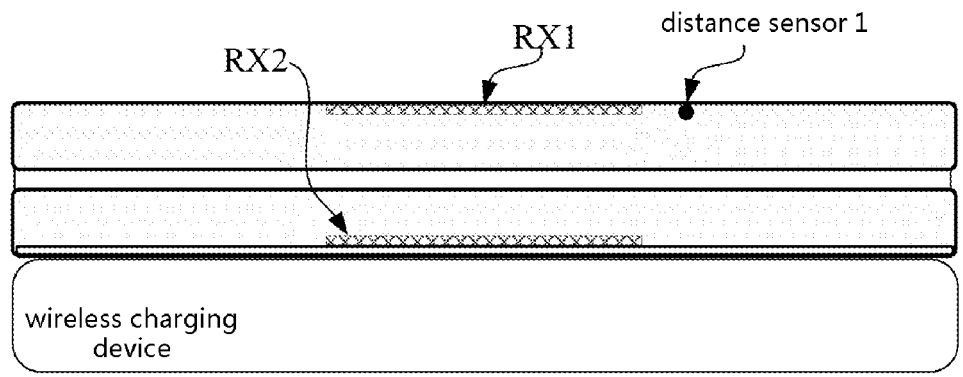
FIG. 10B is a schematic diagram illustrating a placed attitude determined according to the distance data, wherein a first side surface (i.e., a side surface provided with a back casing) of the foldable-screen electronic device is proximal to the wireless charging device.

As an example, the spatial attitude data include distance data (e.g., distance value acquired by the distance sensor 1 in FIG. 1A) referring to the distance value between the electronic device and the wireless charging device. The processor can acquire the placed attitude of the foldable-screen electronic device. Referring to FIG. 9, in S91, the processor can acquire distance data between two foldable portions of the foldable-screen electronic device. In S92, when the distance data is less than the predetermined distance threshold, the processor can determine that the placed attitude is that the second side surface of the foldable-screen electronic device is proximal to the wireless charging device, as shown in FIG. 10A; or when the distance data is greater than the predetermined distance threshold, the processor can determine that the placed attitude is that the first side surface of the foldable-screen electronic device is proximal to the wireless charging device, as shown in FIG. 10B.

Referring back to FIG. 4, in S44, when the placed attitude is that the first side surface of the foldable-screen electronic device is proximal to the wireless charging device, the first receiving assembly is selected to charge the batteries of the foldable-screen electronic device; and when the placed attitude is that the second side surface of the foldable-screen electronic device is proximal to the wireless charging device, the second receiving assembly is selected to charge the batteries of the foldable-screen electronic device. In the exemplary embodiment, by selecting the receiving assembly proximal to the wireless charging device to charge the batteries, the distance between the transmitting coil and the receiving coil in the wireless charging device is relatively small, improving the charging efficiency and shortening the charging time.

In another example, when the processor may further acquire an attitude except the attitudes that the first side surface of the foldable-screen electronic device is proximal to the wireless charging device and the second side surface of the foldable-screen electronic device is proximal to the wireless charging device, at this point, the processor can switch off the first receiving assembly and the second receiving assembly to stop charging the batteries. In actual application, the processor may further generate a prompting message to a user to remind the user that the current placing position of the foldable-screen electronic device is inappropriate and suggest that the foldable-screen electronic device is to be repositioned.

Figure 11:
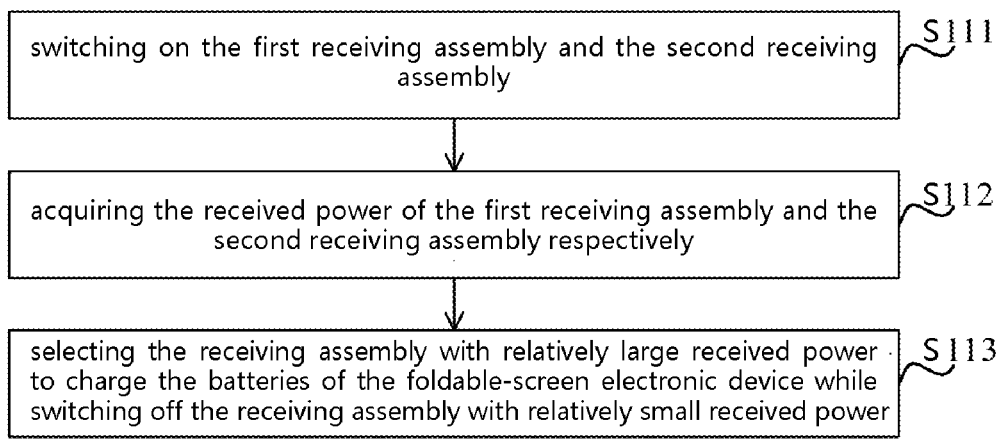
FIG. 11 is a flowchart illustrating the process of selecting the receiving assembly according to the received power in accordance with some embodiments.

In still another example, when the processor may further acquire a placed attitude except that the first side surface of the foldable-screen electronic device is proximal to the wireless charging device and the second side surface of the foldable-screen electronic device is proximal to the wireless charging device, the processor can perform the following processing. Referring to FIG. 11, in S111, the processor can switch on the first receiving assembly and the second receiving assembly. In S112, the processor can acquire the received power of the first receiving assembly and the second receiving assembly, respectively. Considering that the receiving power of the receiving coil is generally high when the receiving coil is proximal to the transmitting coil, in S113, the processor may select the receiving assembly with large received power to charge the batteries of the foldable-screen electronic device and meanwhile switch off the receiving assembly with small received power.

As such, in the embodiments of the present disclosure, the charging type supported by the wireless charging device is acquired after handshake communication with the wireless charging device, and subsequently, the first receiving assembly and/or the second receiving assembly is selected to charge the batteries of the foldable-screen electronic device based on the charging type. As such, in the embodiment, by arranging the first receiving assembly and the second receiving assembly in the foldable-screen electronic device, at least one receiving assembly can be selected to wirelessly charge the batteries of the electronic device when one of side surfaces of the foldable-screen electronic device is proximal to the wireless charging device, improving the charging efficiency and shortening the charging time. Moreover, the user experience can be improved as the users do not need to select a specified side surface for charging.

Figure 12:
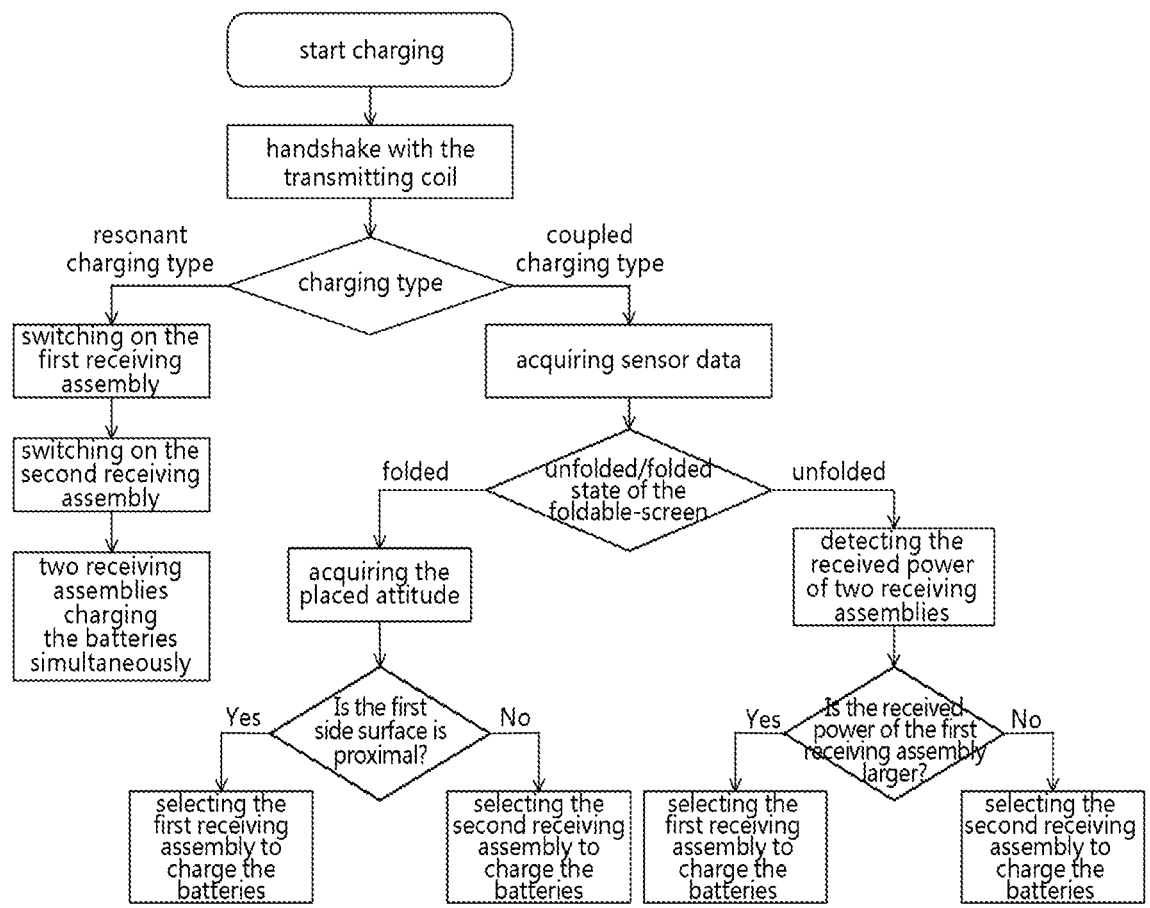
FIG. 12 is a flowchart for an application scene diagram in accordance with some embodiments.

The above wireless charging method will be further described below in combination with a scene. Referring to FIG. 12, the foldable-screen electronic device is placed on the wireless charging device to prepare for charging, and the foldable-screen electronic device achieve handshake communication with the wireless charging device. The charging type supported by the wireless charging device can be acquired according to the handshake communication protocol type. For example, when the wireless charging protocol is A4WP, the wireless charging device can support resonant charging type; and when the wireless charging protocol is Qi, the wireless charging device can support coupled charging type.

In a case of resonant charging type, the first receiving assembly and the second receiving assembly are simultaneously switched on to simultaneously charge the batteries of the foldable-screen electronic device.

In a case of coupled charging type, sensor data are acquired, and then the unfolded/folded state of the foldable-screen electronic device is acquired according to the sensor data.

When the foldable-screen is folded, the placed attitude of the foldable-screen electronic device is acquired. As an example, the sensor is A+G sensor, after the gravity component G1 is greater than the component threshold in the negative direction of the Z axis, it is determined that the first side surface (one side surface provided with the back casing) of the foldable-screen electronic device is proximal to the wireless charging device, and then the first receiving assembly is adopted to charge the batteries; and if the gravity component G1 is greater than the component threshold in the positive direction of the Z axis, it is determined that the second side surface (one side surface provided with the display screen) of the foldable-screen electronic device is proximal to the wireless charging device, and then the second receiving assembly is adopted to charge the batteries.

When the foldable-screen is unfolded, the received power of the first receiving assembly and the second receiving assembly is acquired. When the received power of the first receiving assembly is greater than the received power of the second receiving assembly, the first receiving assembly is selected to charge the batteries; and when the received power of the second receiving assembly is greater than the received power of the first receiving assembly, the second receiving assembly is selected to charge the batteries.

Figure 13:
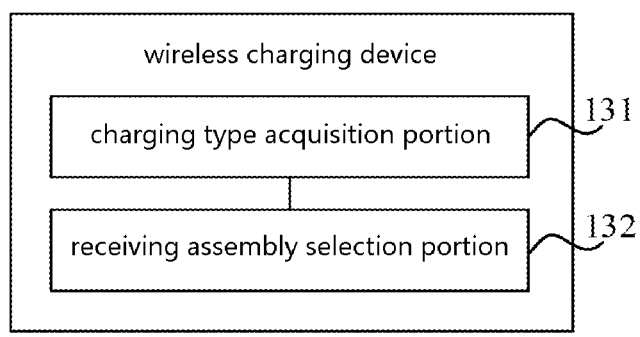
FIG. 13 is a block diagram illustrating a wireless charging device in accordance with some embodiments.

Various embodiments of the present disclosure further provide a wireless charging device applicable to a foldable-screen electronic device provided with a first receiving assembly and a second receiving assembly. FIG. 13 illustrates a block diagram of a wireless charging device in accordance with some embodiments. Referring to FIG. 13, the wireless charging device includes:

a charging type acquisition portion (module) 131 configured to acquire the charging type supported by the wireless charging device after handshake communication with the wireless charging device; and a receiving assembly selection portion (module) 132 configured to select the first receiving assembly and/or the second receiving assembly to charge the batteries of the foldable-screen electronic device based on the charging type.

Figure 14:
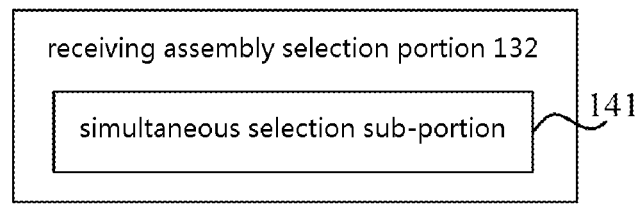
FIG. 14 is a block diagram illustrating a receiving assembly selection portion of a wireless charging device in accordance with some embodiments.

In some embodiments, referring to FIG. 14, the charging type includes resonant charging type, and the receiving assembly selection portion 132 includes:

a simultaneous selection sub-portion (sub-module) 141 configured to select the first receiving assembly and the second receiving assembly to simultaneously charge the batteries.

Figure 15:
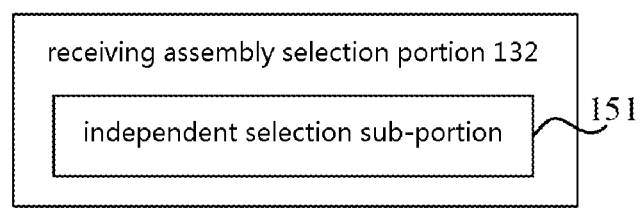
FIG. 15 is a block diagram illustrating a receiving assembly selection portion of a wireless charging device in accordance with some embodiments.

In some embodiments, referring to FIG. 15, the charging type includes coupled charging type, and the receiving assembly selection portion 132 includes:

an independent selection sub-portion (sub-module) 151 configured to select the first receiving assembly or the second receiving assembly to independently charge the batteries.

Figure 16:
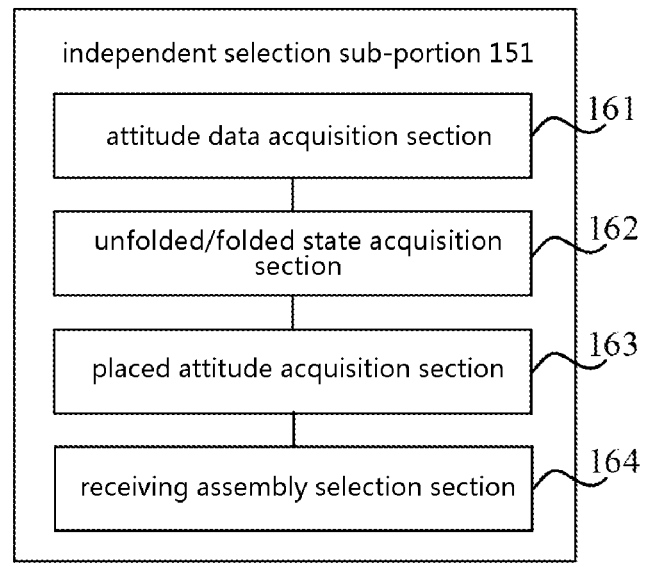
FIG. 16 is a block diagram illustrating an independent selection sub-portion of a wireless charging device in accordance with some embodiments.
Figure 17:
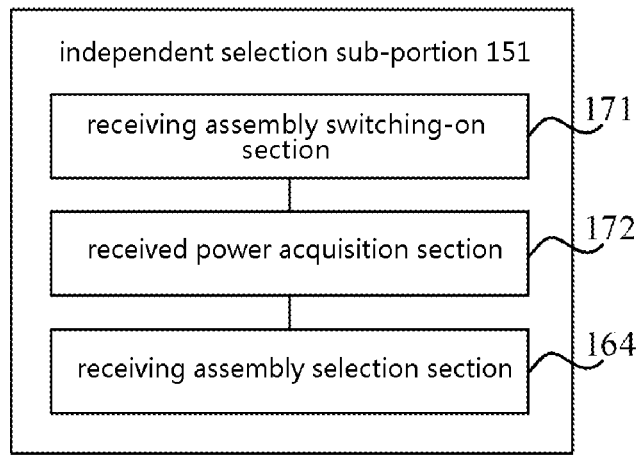
FIG. 17 is a block diagram illustrating an independent selection sub-portion of a wireless charging device in accordance with some embodiments.

In some embodiments, referring to FIG. 16, the independent selection sub-portion 151 includes:

an attitude data acquisition section (unit) 161 configured to acquire spatial attitude data collected by a spatial attitude sensor in the foldable-screen electronic device;

an unfolded/folded state acquisition section (unit) 162 configured to acquire the unfolded/folded state of the foldable-screen electronic device according to the spatial attitude data, wherein the unfolded/folded state includes that the foldable-screen is folded or the foldable-screen is unfolded;

a placed attitude acquisition section (unit) 163 configured to acquire the placed attitude of the foldable-screen electronic device when the unfolded/folded state is that the foldable-screen is folded, wherein the placed attitude is that a first side surface of the foldable-screen electronic device is proximal to the wireless charging device, or that a second side surface of the foldable-screen electronic device is proximal to the wireless charging device; and a receiving assembly selection section (unit) 164 configured to select the first receiving assembly to charge the batteries when the placed attitude is that the first side surface of the foldable-screen electronic device is proximal to the wireless charging device, or select the second receiving assembly to charge the batteries when the placed attitude is that the second side surface of the foldable-screen electronic device is proximal to the wireless charging device.

In some embodiments, referring to FIG. 7, the independent selection sub-portion 151 further includes:

a receiving assembly switching-on section (unit) 171 configured to switch on the first receiving assembly and the second receiving assembly when the unfolded/folded state is that the foldable-screen is unfolded; and a received power acquisition section (unit) 172 configured to acquire the received power of the first receiving assembly and the second receiving assembly, respectively; and the receiving assembly selection section 164 is further configured to select the receiving assembly with large received power to charge the batteries while switching off the receiving assembly with small received power.

Figure 18:
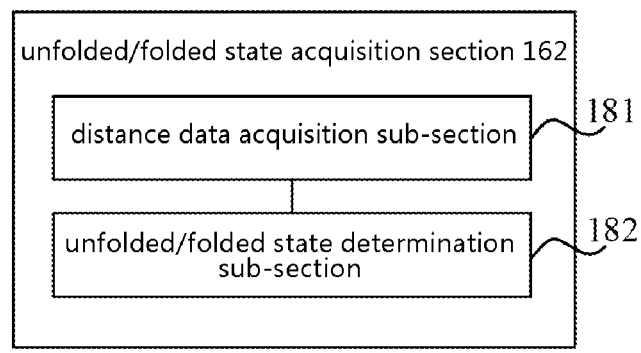
FIG. 18 is a block diagram illustrating an unfolded/folded state acquisition section of a wireless charging device in accordance with some embodiments.

In some embodiments, referring to FIG. 18, the unfolded/folded state acquisition section 162 includes:

a distance data acquisition sub-section (sub-unit) 181 configured to acquire distance data among the spatial attitude data; and an unfolded/folded state determination sub-section (sub-unit) 182 configured to determine that the unfolded/folded state is that the foldable-screen is folded when the distance data is less than a predetermined distance threshold, or determine that the unfolded/folded state is that the foldable-screen is unfolded when the distance data is greater than the predetermined distance threshold.

Figure 19:
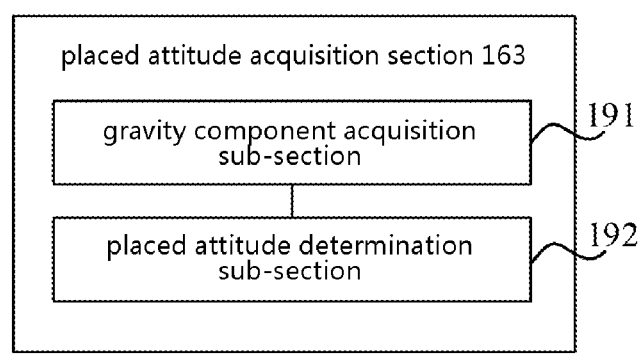
FIG. 19 is a block diagram illustrating a placed attitude acquisition section of a wireless charging device in accordance with some embodiments.

In some embodiments, referring to FIG. 19, the placed attitude acquisition section 163 includes:

a gravity component acquisition sub-section (sub-unit) 191 configured to acquire gravity data among the spatial attitude data and the gravity component of the gravity data on Z axis, wherein the Z axis is perpendicular to the foldable-screen and points from the first side surface to the second side surface when the foldable-screen is folded; and a placed attitude determination sub-section (sub-unit) 192 configured to determine that the placed attitude is that the first side surface of the foldable-screen electronic device is proximal to the wireless charging device when the gravity component is greater than a predetermined component threshold and points towards a negative direction of the Z axis, or determine that the placed attitude is that the second side surface of the foldable-screen electronic device is proximal to the wireless charging device when the gravity component is greater than the predetermined component threshold and points towards a positive direction of the Z axis.

Figure 20:
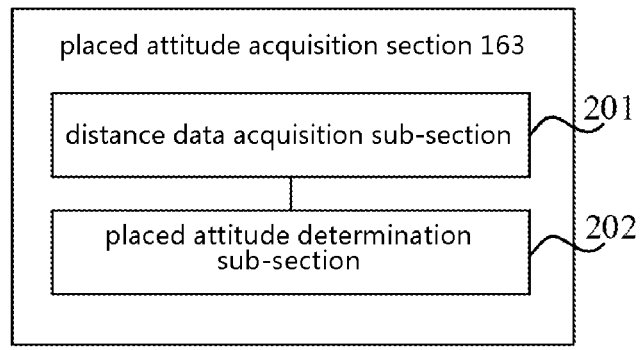
FIG. 20 is a block diagram illustrating a placed attitude acquisition section of a wireless charging device in accordance with some embodiments.

In some embodiments, referring to FIG. 20, the placed attitude acquisition section 163 includes:

a distance data acquisition sub-section (sub-unit) 201 configured to acquire distance data detected by a distance sensor in the foldable-screen electronic device; and a placed attitude determination sub-section (sub-unit) 202 configured to determine that the placed attitude is that the second side surface of the foldable-screen electronic device is proximal to the wireless charging device when the distance data is less than a predetermined distance threshold, or determine that the placed attitude is that the first side surface of the foldable-screen electronic device is proximal to the wireless charging device when the distance data is greater than the predetermined distance threshold.

In some embodiments, the receiving assembly selection section 173 is further configured to switch off the first receiving assembly and the second receiving assembly to stop charging the batteries when the placed attitude is an attitude except that the first side surface of the foldable-screen electronic device is proximal to the wireless charging device and the second side surface of the foldable-screen electronic device is proximal to the wireless charging device.

It should be understood that the device provided in the embodiments of the present disclosure corresponds to the content of the above embodiments of method. For specific content, reference may be made to the content of the method embodiments, and details will not be described herein repeatedly.

As such, in some embodiments of the present disclosure, the charging type supported by the wireless charging device can be acquired after handshake communication with the wireless charging device, and subsequently, the first receiving assembly and/or the second receiving assembly is selected to charge the batteries of the foldable-screen electronic device based on the charging type. In this way, in the embodiments, by arranging the first receiving assembly and the second receiving assembly in the foldable-screen electronic device, at least one of the receiving assemblies can be selected to wirelessly charge the batteries of the electronic device when one side surface of the foldable-screen electronic device is proximal to the wireless charging device, improving the charging efficiency and shortening the charging time. Moreover, the user experience of can be improved as the users do not need to select a specified side surface for charging.

Figure 21:
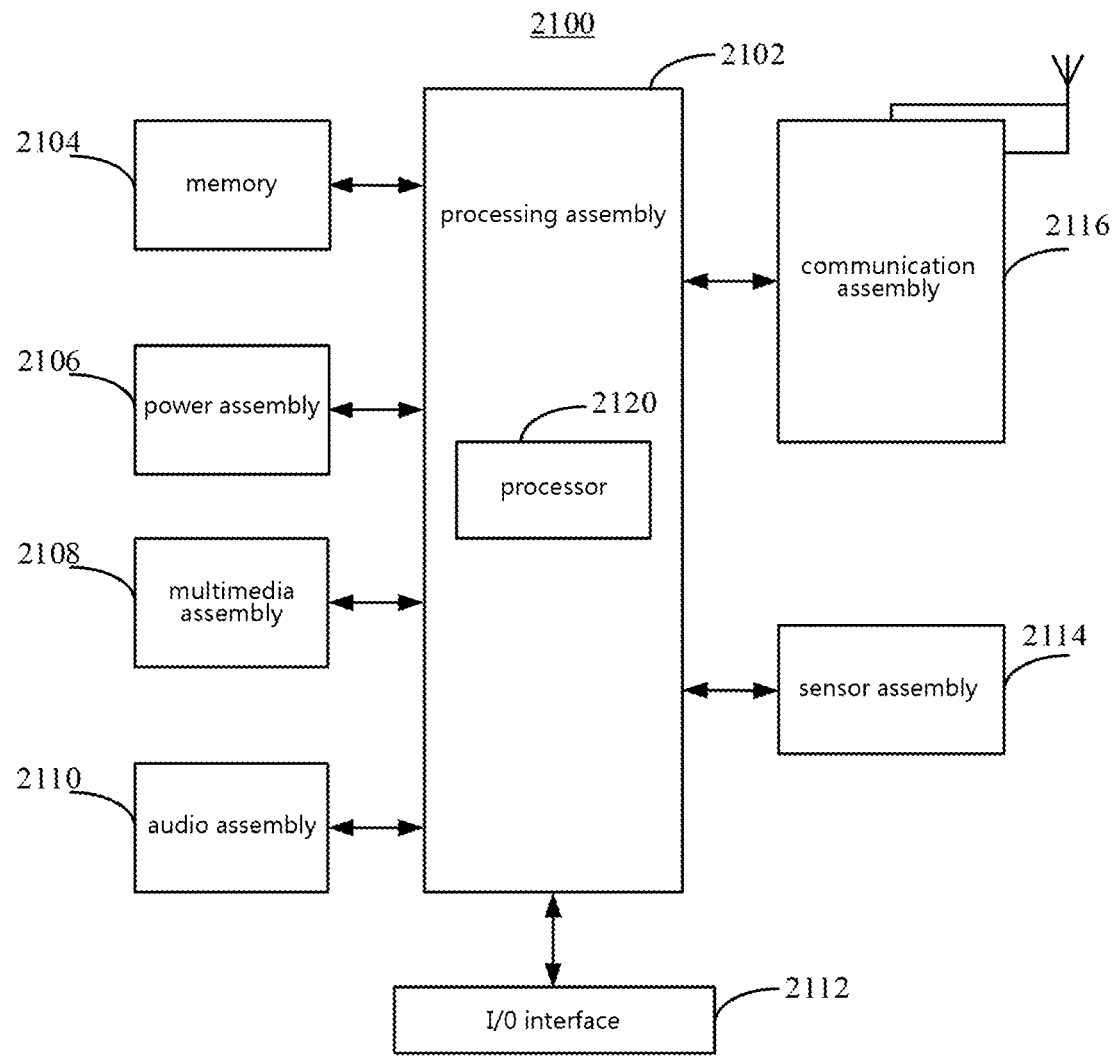
FIG. 21 is a block diagram illustrating a foldable-screen electronic device in accordance with some embodiments.

FIG. 21 is a block diagram illustrating a foldable-screen electronic device in accordance with some embodiments. For example, the foldable-screen electronic device 2100 may be a smart phone, a computer, a digital broadcasting terminal, a tablet, a medical device, a fitness apparatus, a personal digital assistant, and the like, including a transmitting coil, a first magnetic sensor and a second magnetic sensor in a wireless charging device.

Referring to FIG. 21, the foldable-screen electronic device 2100 may comprise one or more of a processing assembly 2102, a memory 2104, a power assembly 2106, a multi-media assembly 2108, an audio assembly 2110, an input/output (I/O) interface 2121, a sensor assembly 2114 and a communication assembly 2116.

The processing assembly 2102 typically controls overall operations of the foldable-screen electronic device 2100, such as the operations associated with display screen, telephone calls, data communications, camera operations, and recording operations. The processing assembly 2102 may include one or more processors 2120 to execute instructions. Moreover, the processing assembly 2102 may include one or more module/portions facilitating the interaction between the processing assembly 2102 and other assemblies.

The memory 2104 is configured to store various types of data to support the operation of the foldable-screen electronic device 2100. Examples of such data include instructions for any applications or methods operated on the foldable-screen electronic device 2100, contact data, phonebook data, messages, pictures, video, etc. The memory 2104 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power assembly 2106 provides power to various assemblies of the foldable-screen electronic device 2100. The power assembly 2106 may include a power management system, one or more power sources, and any other assemblies associated with the generation, management, and distribution of power in the foldable-screen electronic device 2100.

The multimedia assembly 2108 includes a screen (e.g., a foldable screen) providing an output interface between the foldable-screen electronic device 2100 and a target object. In some embodiments, the screen may include a liquid crystal display screen (LCD) and a touch panel (TP). In some embodiments, organic light-emitting diode (OLED) or other types of displays can be employed. If the screen includes the touch panel, the screen may be implemented as a touch screen to receive input signals from the target object. The touch panel includes one or more touch sensors to sense touches, swipes, and gestures on the touch panel. The touch sensors may not only sense a boundary of a touch or swipe action, but also sense a period of time and a pressure associated with the touch or swipe action.

The audio assembly 2110 is configured to output and/or input audio signals. For example, the audio assembly 2110 includes a microphone (MIC) configured to receive an external audio signal when the foldable-screen electronic device 2100 is in an operation mode, such as a call mode, a recording mode, and a voice recognition mode. The received audio signal may be further stored in the memory 2104 or transmitted via the communication assembly 2116. In some embodiments, the audio assembly 2110 further includes a speaker to output audio signals.

The I/O interface 2121 provides an interface between the processing assembly 2102 and peripheral interface portions, such as a keyboard, a click wheel, buttons, and the like.

The sensor assembly 2114 includes one or more sensors to provide status assessments of various aspects of the foldable-screen electronic device 2100. For example, the sensor assembly 2114 may detect an unfolded/folded status of the foldable-screen electronic device 2100, relative positioning of assemblies (e.g., the display screen and the keypad) of the foldable-screen electronic device 2100, position changes of the foldable-screen electronic device 2100 or assemblies thereof, a presence or absence of target object contacting with the foldable-screen electronic device 2100, an orientation or an acceleration/deceleration of the foldable-screen electronic device 2100, and temperature changes of the foldable-screen electronic device 2100.

The communication assembly 2116 is configured to facilitate communication, wired or wirelessly, between the foldable-screen electronic device 2100 and other devices. The foldable-screen electronic device 2100 can access a wireless network based on a communication standard, such as Wi-Fi, 2G, 3G, 4G, 5G or a combination thereof. In one exemplary embodiment, the communication assembly 2116 receives a broadcast signal or broadcast associated information from an external broadcast management system via a broadcast channel. In one exemplary embodiment, the communication assembly 2116 further includes a near field communication (NFC) module/portion to facilitate short-range communications. For example, the NFC module/portion may be implemented based on a radio frequency identification (RFID) technology, an infrared data association (IrDA) technology, an ultra-wideband (UWB) technology, a Bluetooth (BT) technology, and other technologies.

In exemplary embodiments, the foldable-screen electronic device 2100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic assemblies, for performing the above described methods.

In exemplary embodiments, there is also provided a non-transitory readable storage medium including executable instructions, such as included in the memory 2104, executable by the processor 2120 in the audio assembly. Herein, the readable storage medium may be a ROM, a random-access memory (RAM), a CD-ROM, a magnetic tape, a floppy disc, an optical data storage device, and the like.

The various device components, modules, units, sections, circuits, assemblies, blocks, or portions may have modular configurations, or are composed of discrete components, but nonetheless can be referred to as "modules" in general. In other words, the "components," "modules," "blocks," "sections," "circuits," "assemblies," "portions," or "units" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A wireless charging method, applicable to a foldable-screen electronic device provided with a first receiving assembly disposed on a first side surface of the foldable-screen electronic device, and a second receiving assembly disposed on a second side surface of the foldable-screen electronic device, the wireless charging method comprising:

acquiring a charging type supported by a wireless charging device after handshake communication between the foldable-screen electronic device and the wireless charging device; and selecting at least one of the first receiving assembly and the second receiving assembly to charge batteries of the foldable-screen electronic device based on the charging type when either one of the first and second side surfaces is proximal to the wireless charging device, wherein an external display screen with a first area is disposed on the second side surface, which is on a back of the foldable-screen electronic device, a built-in display screen with a second area is hidden when the foldable-screen is folded, the second area is larger than the first area, and the foldable-screen electronic device is configured for wireless charging without user selection of a specified side surface for the wireless charging.

2. The wireless charging method according to claim 1, wherein the charging type comprises a resonant charging type; and the selecting the first receiving assembly and/or the second receiving assembly to charge the batteries of the foldable-screen electronic device based on the charging type comprises:

selecting the first receiving assembly and the second receiving assembly to simultaneously charge the batteries.

3. The wireless charging method according to claim 1, wherein the charging type comprises a coupled charging type; and the selecting the first receiving assembly and/or the second receiving assembly to charge the batteries of the foldable-screen electronic device based on the charging type comprises:

selecting the first receiving assembly or the second receiving assembly to independently charge the batteries.

4. The wireless charging method according to claim 3, wherein the selecting the first receiving assembly or the second receiving assembly to independently charge the batteries comprises:

acquiring spatial attitude data collected by a spatial attitude sensor in the foldable-screen electronic device;

acquiring the unfolded/folded state of the foldable-screen electronic device according to the spatial attitude data, the unfolded/folded state being that a foldable-screen of the foldable-screen electronic device is folded or the foldable-screen is unfolded;

acquiring a placed attitude of the foldable-screen electronic device when the unfolded/folded state is that the foldable-screen is folded, wherein the placed attitude is that a first side surface of the foldable-screen electronic device is proximal to the wireless charging device or that a second side surface of the foldable-screen electronic device is proximal to the wireless charging device;

selecting the first receiving assembly to charge the batteries when the placed attitude is that the first side surface of the foldable-screen electronic device is proximal to the wireless charging device; and selecting the second receiving assembly to charge the batteries when the placed attitude is that the second side surface of the foldable-screen electronic device is proximal to the wireless charging device.

5. The wireless charging method according to claim 4, after the acquiring the unfolded/folded state of the foldable-screen electronic device according to the spatial attitude data, further comprising:

switching on the first receiving assembly and the second receiving assembly when the unfolded/folded state is that the foldable-screen is unfolded;

acquiring the received power of the first receiving assembly and the second receiving assembly, respectively; and selecting the receiving assembly with large received power to charge the batteries, while switching off the receiving assembly with small received power, among the first and second receiving assemblies.

6. The wireless charging method according to claim 4, wherein the acquiring the unfolded/folded state of the foldable-screen electronic device according to the spatial attitude data comprises:

acquiring distance data among the spatial attitude data; and determining that the unfolded/folded state is that the foldable-screen is folded when the distance data is less than a predetermined distance threshold; or determining that the unfolded/folded state is that the foldable-screen is unfolded when the distance data is greater than the predetermined distance threshold.

7. The wireless charging method according to claim 4, wherein the acquiring the placed attitude of the foldable-screen electronic device comprises:

acquiring gravity data among the spatial attitude data and the gravity component of the gravity data on Z axis, the Z axis being perpendicular to the foldable-screen and oriented from the first side surface to the second side surface when the foldable-screen is folded; and determining that the placed attitude is that the first side surface of the foldable-screen electronic device is proximal to the wireless charging device when the gravity component is greater than a predetermined component threshold and points towards a negative direction of the Z axis; or determining that the placed attitude is that the second side surface of the foldable-screen electronic device is proximal to the wireless charging device when the gravity component is greater than the predetermined component threshold and points towards a positive direction of the Z axis.

8. The wireless charging method according to claim 4, wherein the acquiring the placed attitude of the foldable-screen electronic device comprises:

acquiring distance data detected by a distance sensor in the foldable-screen electronic device; and determining that the placed attitude is that the second side surface of the foldable-screen electronic device is proximal to the wireless charging device when the distance data is less than a predetermined distance threshold; or determining that the placed attitude is that the first side surface of the foldable-screen electronic device is proximal to the wireless charging device when the distance data is greater than the predetermined distance threshold.

9. The wireless charging method according to claim 4, after the acquiring the placed attitude of the foldable-screen electronic device, further comprising:

switching off the first receiving assembly and the second receiving assembly to stop charging the batteries, when the placed attitude is an attitude except that the first side surface of the foldable-screen electronic device is proximal to the wireless charging device and the second side surface of the foldable-screen electronic device is proximal to the wireless charging device.

10. A wireless charging device, applicable to a foldable-screen electronic device provided with a first receiving assembly disposed on a first side surface of the foldable-screen electronic device, and a second receiving assembly disposed on a second side surface of the foldable-screen electronic device, the wireless charging device comprising:

a charging type acquisition portion configured to acquire the charging type supported by the wireless charging device after handshake communication between the foldable-screen electronic device and the wireless charging device; and a receiving assembly selection portion configured to select at least one of the first receiving assembly and the second receiving assembly to charge batteries of the foldable-screen electronic device based on the charging type when either one of the first and second side surfaces is proximal to the wireless charging device, wherein an external display screen with a first area is disposed on the second side surface, which is on a back of the foldable-screen electronic device, a built-in display screen with a second area is hidden when the foldable-screen is folded, the second area is larger than the first area, and the foldable-screen electronic device is configured for wireless charging without user selection of a specified side surface for the wireless charging.

11. The wireless charging device according to claim 10, wherein the charging type comprises a resonant charging type; and the receiving assembly selection portion comprises:

a simultaneous selection sub-portion configured to select the first receiving assembly and the second receiving assembly to simultaneously charge the batteries.

12. The wireless charging device according to claim 10, wherein the charging type comprises a coupled charging type; and the receiving assembly selection portion comprises:

an independent selection sub-portion configured to select the first receiving assembly or the second receiving assembly to independently charge the batteries.

13. The wireless charging device according to claim 12, wherein the independent selection sub-portion comprises:

an attitude data acquisition section configured to acquire spatial attitude data collected by a spatial attitude sensor in the foldable-screen electronic device;

an unfolded/folded state acquisition section configured to acquire the unfolded/folded state of the foldable-screen electronic device according to the spatial attitude data, the unfolded/folded state comprising that the foldable-screen is folded or the foldable-screen is unfolded;

a placed attitude acquisition section configured to acquire the placed attitude of the foldable-screen electronic device when the unfolded/folded state is that the foldable-screen is folded, the placed attitude being that a first side surface of the foldable-screen electronic device is proximal to the wireless charging device, or that a second side surface of the foldable-screen electronic device is proximal to the wireless charging device; and a receiving assembly selection section configured to select the first receiving assembly to charge the batteries when the placed attitude is that the first side surface of the foldable-screen electronic device is proximal to the wireless charging device, or select the second receiving assembly to charge the batteries when the placed attitude is that the second side surface of the foldable-screen electronic device is proximal to the wireless charging device.

14. The wireless charging device according to claim 13, wherein the independent selection sub-portion further comprises:
- a receiving assembly switching-on section configured to switch on the first receiving assembly and the second receiving assembly when the unfolded/folded state is that the foldable-screen is unfolded; and
- a received power acquisition section configured to acquire the received power of the first receiving assembly and the second receiving assembly, respectively; and
- the receiving assembly selection section is further configured to select the receiving assembly with large received power to charge the batteries and simultaneously switch off the receiving assembly with small received power, among the first and second receiving assemblies.

15. The wireless charging device according to claim 13, wherein the unfolded/folded state acquisition section comprises:
- a distance data acquisition sub-section configured to acquire distance data among the spatial attitude data; and
- an unfolded/folded state determination sub-section configured to determine that the unfolded/folded state is that the foldable-screen is folded when the distance data is less than a predetermined distance threshold, or determine that the unfolded/folded state is that the foldable-screen is unfolded when the distance data is greater than the predetermined distance threshold.

16. The wireless charging device according to claim 13, wherein the placed attitude acquisition section comprises:
- a gravity component acquisition sub-section configured to acquire gravity data among the spatial attitude data and the gravity component of the gravity data on Z axis, the Z axis being perpendicular to the foldable-screen and oriented from the first side surface to the second side surface when the foldable-screen is folded; and
- a placed attitude determination sub-section configured to determine that the placed attitude is that the first side surface of the foldable-screen electronic device is proximal to the wireless charging device when the gravity component is greater than a predetermined component threshold and points towards a negative direction of the Z axis, or determine that the placed attitude is that the second side surface of the foldable-screen electronic device is proximal to the wireless charging device when the gravity component is greater than the predetermined component threshold and points towards a positive direction of the Z axis.

17. The wireless charging device according to claim 13, wherein the placed attitude acquisition section comprises:
- a distance data acquisition sub-section configured to acquire distance data detected by a distance sensor in the foldable-screen electronic device; and
- a placed attitude determination sub-section configured to determine that the placed attitude is that the second side surface of the foldable-screen electronic device is proximal to the wireless charging device when the distance data is less than a predetermined distance threshold, or determine that the placed attitude is that the first side surface of the foldable-screen electronic device is proximal to the wireless charging device when the distance data is greater than the predetermined distance threshold.

18. The wireless charging device according to claim 13, wherein the receiving assembly selection section is further configured to switch off the first receiving assembly and the second receiving assembly to stop charging the batteries, when the placed attitude is an attitude except that the first side surface of the foldable-screen electronic device is proximal to the wireless charging device and the second side surface of the foldable-screen electronic device is proximal to the wireless charging device.

19. A foldable-screen electronic device, comprising:
- a foldable-screen;
- a first receiving assembly disposed on a first side surface of the foldable-screen electronic device;
- a second receiving assembly disposed on a second side surface of the foldable-screen electronic device;
- a processor connected with the first receiving assembly and the second receiving assembly, respectively;
- memory storing instructions for execution by the processor; and
- batteries connected with the first receiving assembly and the second receiving assembly, respectively;

wherein the processor is configured to execute:
- acquiring a charging type supported by a wireless charging device after handshake communication between the foldable-screen electronic device and the wireless charging device; and
- selecting at least one of the first receiving assembly and the second receiving assembly to charge batteries of the foldable-screen electronic device based on the charging type when either one of the first and second side surfaces is proximal to the wireless charging device, wherein
- an external display screen with a first area is disposed on the second side surface, which is on a back of the foldable-screen electronic device,
- a built-in display screen with a second area is hidden when the foldable-screen is folded,
- the second area is larger than the first area, and
- the foldable-screen electronic device is configured for wireless charging without user selection of a specified side surface for the wireless charging.

20. An electronic apparatus set comprising a foldable-screen electronic device and a wireless charging device, wherein:
the foldable-screen electronic device comprises:
- a foldable-screen;
- a first receiving assembly disposed on a first side surface of the foldable-screen electronic device;
- a second receiving assembly disposed on a second side surface of the foldable-screen electronic device;
- a processor connected with the first receiving assembly and the second receiving assembly, respectively;
- memory storing instructions for execution by the processor; and
- batteries connected with the first receiving assembly and the second receiving assembly, respectively;

wherein the processor is configured to execute:
- acquiring a charging type supported by a wireless charging device after handshake communication between the foldable-screen electronic device and the wireless charging device; and
- selecting at least one of the first receiving assembly and the second receiving assembly to charge batteries of the foldable-screen electronic device based on the charging type when either one of the first and second side surfaces is proximal to the wireless charging device, wherein
- an external display screen with a first area is disposed on the second side surface, which is on a back of the foldable-screen electronic device, a built-in display screen with a second area is hidden when the foldable-screen is folded, the second area is larger than the first area, and the foldable-screen electronic device is configured for wireless charging without user selection of a specified side surface for the wireless charging;

a receiving coil in the first receiving assembly is arranged on the first side surface of the foldable-screen electronic device; a receiving coil in the second receiving assembly is arranged on the second side surface of the foldable-screen electronic device;

the first side surface is a side surface opposite to the external display screen when the foldable-screen is folded, and the second side surface is a side surface provided with the external display screen when the foldable-screen is folded; or the first side surface is a side surface provided with an auxiliary display screen when the foldable-screen is folded, and the second side surface is a side surface provided with a main display screen when the foldable-screen is folded;

an offset distance between a center position of the receiving coil in the first receiving assembly and a center position of the receiving coil in the second receiving assembly is less than a predetermined distance threshold;

the foldable-screen electronic device further comprises a spatial attitude sensor configured to sense attitude data of the foldable-screen electronic device, and a distance sensor configured to sense distance data between the foldable-screen electronic device and the wireless charging device;

at least one of the first and second receiving assemblies is selected to wirelessly charge the batteries of the foldable-screen electronic device upon one side surface of the foldable-screen electronic device being proximal to the wireless charging device, without user selecting a specified side surface for charging.

\* \* \* \* \*